United States Patent
Eo et al.

(10) Patent No.: US 10,553,892 B2
(45) Date of Patent: Feb. 4, 2020

(54) RECHARGEABLE BATTERY

(71) Applicant: SAMSUNG SDI CO., LTD., Yongin-si, Gyeonggi-do (KR)

(72) Inventors: Soo-Mi Eo, Yongin-si (KR); Jea-Woan Lee, Yongin-si (KR); Seung-Hee Park, Yongin-si (KR); Young-Kwang Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 397 days.

(21) Appl. No.: 14/986,499

(22) Filed: Dec. 31, 2015

(65) Prior Publication Data

US 2016/0260998 A1  Sep. 8, 2016

(30) Foreign Application Priority Data

Mar. 2, 2015 (KR) .................. 10-2015-0029328

(51) Int. Cl.
*H01M 10/04* (2006.01)
*H01M 2/02* (2006.01)
(Continued)

(52) U.S. Cl.
CPC ........ *H01M 10/0431* (2013.01); *H01M 2/021* (2013.01); *H01M 2/0212* (2013.01);
(Continued)

(58) Field of Classification Search
CPC ......... H01M 10/0431; H01M 10/0587; H01M 10/0525; H01M 2/20; H01M 2/26;
(Continued)

(56) References Cited

U.S. PATENT DOCUMENTS

2005/0130035 A1  6/2005 Inada et al.
2005/0287431 A1  12/2005 Cho
(Continued)

FOREIGN PATENT DOCUMENTS

CN  1713438 A  12/2005
CN  1753230 A  3/2006
(Continued)

OTHER PUBLICATIONS

EPO Search Report dated May 23, 2016, corresponding to European Patent Application No. 16158199.6 (9 pages).
(Continued)

*Primary Examiner* — Ula C Ruddock
*Assistant Examiner* — Matthew W Van Oudenaren
(74) *Attorney, Agent, or Firm* — Lewis Roca Rothgerber Christie LLP

(57) ABSTRACT

A rechargeable battery includes: an electrode assembly including a separator between a first electrode and a second electrode each having uncoated regions and coated regions, and in which the separator, the first electrode, and the second electrode are spirally wound; a case that houses the electrode assembly; and a first electrode tab and a second electrode tab to be drawn outside of the case that are respectively coupled to the uncoated regions of the first electrode and the second electrode while maintaining a tab gap between the first electrode tab and the second electrode tab, where the first electrode tab is coupled to a gap uncoated region between the coated regions of the first electrode, and where in a thickness direction of the electrode assembly, in an area facing the first electrode tab, an internal side end uncoated region of the second electrode is located.

15 Claims, 5 Drawing Sheets

(51) Int. Cl.
  *H01M 10/0525* (2010.01)
  *H01M 10/0587* (2010.01)
  *H01M 2/26* (2006.01)

(52) U.S. Cl.
  CPC .......... *H01M 2/0257* (2013.01); *H01M 2/263* (2013.01); *H01M 10/0525* (2013.01); *H01M 10/0587* (2013.01); *H01M 2220/20* (2013.01); *H01M 2220/30* (2013.01)

(58) Field of Classification Search
  CPC .. H01M 2/263; H01M 2/0207; H01M 2/0212; H01M 2/021; H01M 2/0257; H01M 2220/20; H01M 2220/30
  See application file for complete search history.

(56) References Cited

U.S. PATENT DOCUMENTS

| | | | | |
|---|---|---|---|---|
| 2006/0115729 | A1* | 6/2006 | Lee | H01M 2/26 429/211 |
| 2007/0231701 | A1* | 10/2007 | Lee | H01M 2/18 429/246 |
| 2009/0297929 | A1 | 12/2009 | Uchida | |
| 2011/0195286 | A1* | 8/2011 | Aota | H01M 2/263 429/94 |
| 2012/0237809 | A1* | 9/2012 | Ahn | H01M 2/263 429/94 |
| 2013/0337304 | A1* | 12/2013 | Luski | H01M 2/021 429/94 |

FOREIGN PATENT DOCUMENTS

| | | |
|---|---|---|
| CN | 100416891 C | 9/2008 |
| CN | 102148394 A | 8/2011 |
| JP | 2000-021452 | 1/2000 |
| JP | 2007-165224 A | 6/2007 |
| JP | 4380201 B2 | 12/2009 |

OTHER PUBLICATIONS

Full English Translation of Japanese Pub. No. 2004-311282 A for JP Patent No. 4380201 B2.

SIPO Office Action and Search Report, with English translation, dated Nov. 14, 2019, for corresponding Chinese Patent Application No. 201610029949.3 (19 pages).

* cited by examiner

RECHARGEABLE BATTERY

CROSS-REFERENCE TO RELATED APPLICATION

This application claims priority to and the benefit of Korean Patent Application No. 10-2015-0029328 filed in the Korean Intellectual Property Office on Mar. 2, 2015, the entire contents of which are incorporated herein by reference.

BACKGROUND

1. Field

Embodiments of the present disclosure relate to a rechargeable battery that couples or connects an electrode tab to an electrode assembly.

2. Description of the Related Art

With technology development of mobile devices, demand for a rechargeable battery as an energy source has increased. A rechargeable battery can repeatedly perform charge and discharge, unlike a primary battery, which is not designed to be repeatedly charged and discharged.

For example, a rechargeable battery of a small capacity is used for a small portable electronic device like a mobile phone or a laptop computer and a camcorder, and a rechargeable battery of a large capacity is used as a power source for driving a motor of a hybrid vehicle and an electric vehicle.

For example, a rechargeable battery includes an electrode assembly that performs a charge and discharge operation, a pouch that houses the electrode assembly, and an electrode tab that draws out the electrode assembly to the outside of the pouch. The electrode assembly is formed by welding an electrode tab to an uncoated region of an electrode and by spiral-winding an electrode together with a separator.

Because a portion at which an electrode tab is located has a larger thickness than that of a portion at which an electrode tab is not located, a deformation of an electrode assembly occurs at the electrode tab. For example, flatness of an electrode assembly and a cell including an electrode tab is deteriorated and thus a design margin of a thickness is reduced.

The above information disclosed in this Background section is only for enhancement of understanding of the background of the disclosure and therefore it may contain information that does not form the prior art that is already known in this country to a person of ordinary skill in the art.

SUMMARY

Aspects of embodiments of the present disclosure have been made in an effort to provide a rechargeable battery having features of improving flatness of an electrode assembly and a cell, and securing a design margin of a thickness.

An example embodiment of the present disclosure provides a rechargeable battery including: an electrode assembly including a separator between a first electrode and a second electrode each having uncoated regions and coated regions, and in which the separator, the first electrode, and the second electrode are spirally wound; a case that houses the electrode assembly; and a first electrode tab and a second electrode tab to be drawn outside of the case that are respectively coupled to the uncoated regions of the first electrode and the second electrode while maintaining a tab gap between the first electrode tab and the second electrode tab, where the first electrode tab is coupled to a gap uncoated region of the first electrode between the coated regions of the first electrode, and where in a thickness direction of the electrode assembly, in an area facing the first electrode tab, an internal side end uncoated region of the second electrode is located.

The second electrode may have one of the uncoated regions at an internal side end thereof and another one of coated regions at an external side end thereof in a spiral-wound state, and the second electrode tab may be selectively coupled to the internal side end uncoated region or the external side end uncoated region of the second electrode.

The second electrode tab may be coupled to the internal side end uncoated region of the second electrode in a spiral-wound state, and the internal side end uncoated region of the second electrode may face the second electrode tab in the thickness direction of the electrode assembly.

The internal side end uncoated region of the second electrode may be extended in the area facing the first electrode tab in the thickness direction of the electrode assembly.

One of the uncoated regions of the first electrode may include an internal side end uncoated region in a spiral-wound state, and the internal side end uncoated region of the first electrode may be extended in an area facing the second electrode tab in the thickness direction of the electrode assembly.

A thickness t of the first electrode tab may be smaller than a sum of a thickness t1 of the gap uncoated region of the first electrode and a thickness t2 of the internal side end uncoated region of the second electrode such that $t < t1+t2$.

The first electrode tab may be provided at both surfaces of the gap uncoated region.

A thickness t of the first electrode tab may be less than or equal to a sum thickness t3 of the coated region that is provided at both surfaces of the first electrode such that $t \leq t3$.

The thickness t of the first electrode tab may be 70 to 90% of the sum thickness t3 of the coated region that is provided at both surfaces of the first electrode such that $0.7t3 < t < 0.9t3$.

The thickness t of the first electrode tab may be 80% of the sum thickness t3 of the coated region that is provided at both surfaces of the first electrode such that $t = 0.8t3$.

The first electrode may further include an insulating tape attached to the first electrode tab provided at both surfaces of the gap uncoated region.

The insulating tape may be formed to be within a gap range of the gap uncoated region.

The first electrode may be a positive electrode, and the second electrode may be a negative electrode. The first electrode may be a negative electrode, and the second electrode may be a positive electrode.

The case may be formed to be a pouch kind that houses the electrode assembly.

The case may be formed to have a square shape that houses the electrode assembly.

In this way, in an example embodiment of the present disclosure, by coupling a first electrode tab to a gap uncoated region that is provided between coated regions of a first electrode and by providing an internal side end uncoated region of a second electrode in an area facing the first electrode tab, a thickness deviation of an electrode assembly can be reduced between a portion in which a first electrode tab is located and a portion in which a first electrode tab is not located.

Because a thickness deviation of a portion in which the first and second electrodes tabs are located and a portion in which the first and second electrodes tab are not located is reduced, a variation of an electrode assembly is reduced and flatness of the electrode assembly and a cell are improved, and a design margin of a thickness increases. Therefore, a high-capacity design of a rechargeable battery can be attained.

BRIEF DESCRIPTION OF THE DRAWINGS

The accompanying drawings, together with the specification, illustrate embodiments of the present disclosure, and, together with the description, serve to explain the principles of embodiments of the present disclosure.

DETAILED DESCRIPTION

Figure 1:
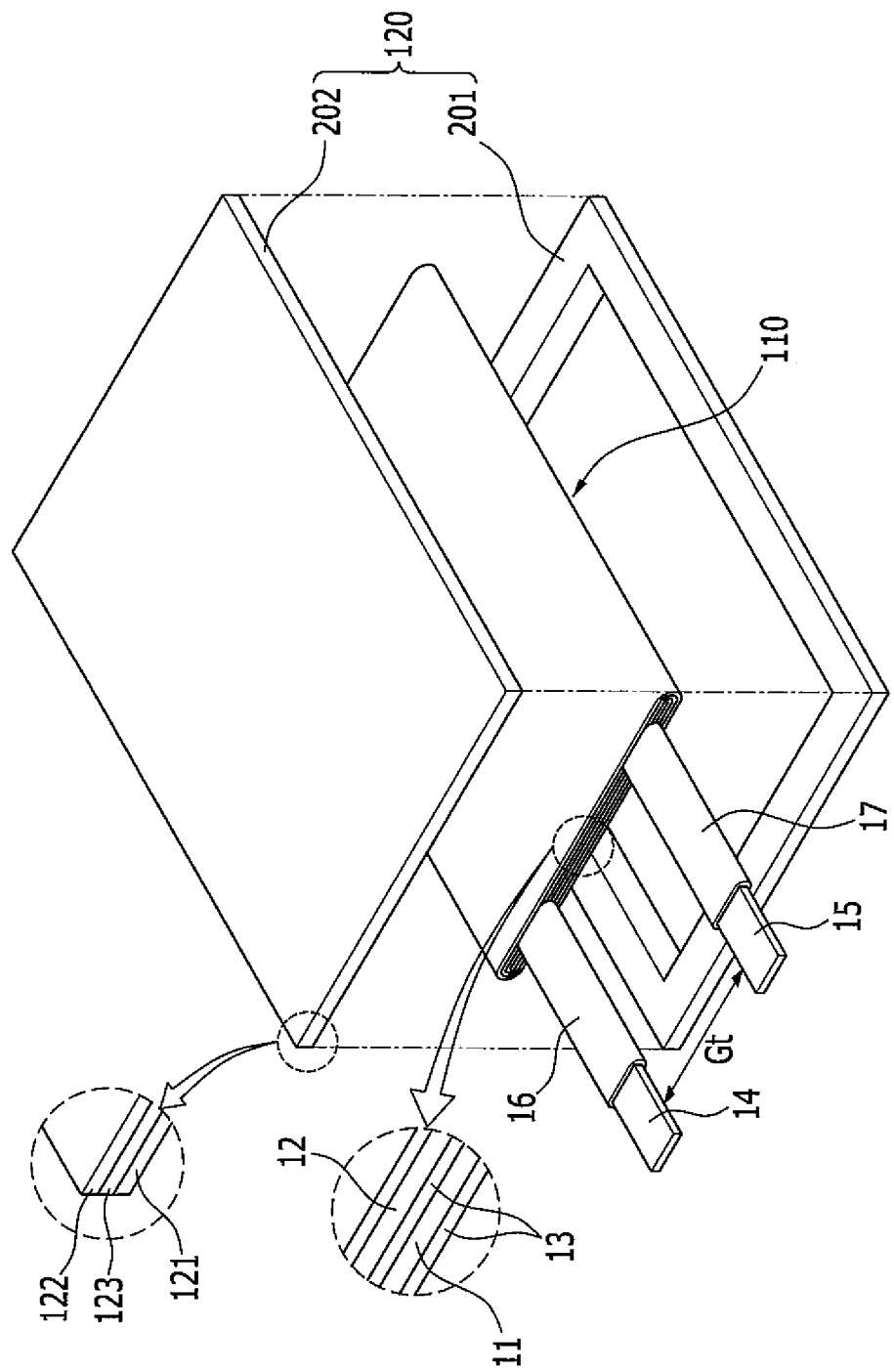
FIG. 1 is an exploded perspective view illustrating a rechargeable battery according to an example embodiment of the present disclosure.

The present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Figure 2:
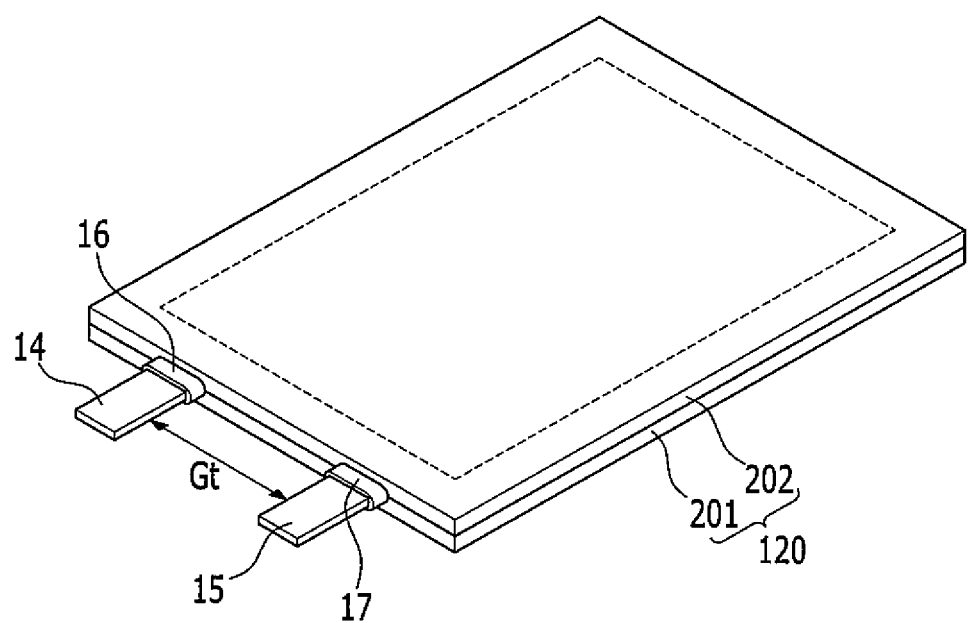
FIG. 2 is a coupled perspective view of the rechargeable battery of FIG. 1.

FIG. 1 is an exploded perspective view illustrating a rechargeable battery according to an example embodiment of the present disclosure, and FIG. 2 is a coupled perspective view of the rechargeable battery of FIG. 1 (e.g., FIG. 2 is a perspective view of the rechargeable battery of FIG. 1 in a coupled state). Referring to FIGS. 1 and 2, the rechargeable battery includes an electrode assembly 110, a case (for example, hereinafter referred to as a "pouch 120") that houses the electrode assembly 110, and a first electrode tab 14 and a second electrode tab 15 that are coupled or connected to the electrode assembly 110 to be drawn out to the outside of the pouch 120.

The electrode assembly 110 is formed to have a jelly roll form by disposing a first electrode (for convenience, referred to as a "positive electrode") 11 and a second electrode (for convenience, referred to as a "negative electrode") 12 with a separator 13 interposed therebetween, and by spiral-winding the first electrode 11, the second electrode 12, and the separator 13. The separator 13 may be formed to have a polymer film that allows lithium ions to pass therethrough. The electrode assembly 110 may be formed to have a plate state having an approximate cuboid shape by pressing while in a spiral-wound state.

The first electrode tab (for convenience, referred to as a "positive electrode tab") 14 and the second electrode tab (for convenience, referred to as a "negative electrode tab") 15 are coupled or connected to the positive and negative electrodes 11 and 12, respectively, at one side of the electrode assembly 110 while maintaining a tab gap Gt between the first electrode tab 14 and the second electrode tab 15. For example, the positive and negative electrode tabs 14 and 15 are coupled or connected to the positive and negative electrodes 11 and 12, respectively, to be drawn out to the outside of the pouch 120.

The pouch 120 houses the electrode assembly 110 and is thermal fusion-bonded at an outer edge portion thereof, thereby forming a rechargeable battery. In this case, the positive and negative electrode tabs 14 and 15 are coated with insulating members 16 and 17, respectively, to be drawn out to the outside of the pouch 120 through the thermal fusion-bonded portion. For example, the insulating members 16 and 17 electrically insulate the positive and negative electrode tabs 14 and 15, respectively, and the pouch 120.

The pouch 120 may be formed to have a multi-layered sheet structure that encloses the outside of the electrode assembly 110. For example, the pouch 120 includes a polymer sheet 121 that forms an inner surface and that performs an insulating and thermal fusion-bonding operation, a nylon sheet 122 that forms an outer surface to perform a protection operation, and a metal sheet 123 that provides mechanical strength. The nylon sheet 122 may be formed to include a polyethylene terephthalate (PET) sheet or a PET-nylon complex sheet 122. The metal sheet 123 is interposed between the polymer sheet 121 and the nylon sheet 122 and may be formed to include, for example, an aluminum sheet.

The pouch 120 includes a first casing material 201 that houses the electrode assembly 110 and a second casing material 202 that covers the electrode assembly 110 and that is thermal fusion-bonded to the first casing material 201 at the outside of the electrode assembly 110. Each of the first and second casing materials 201 and 202 may be formed to include the polymer sheet 121, the nylon sheet 122, and the metal sheet 123 of the same layer structure.

For example, the first casing material 201 is formed to have a concave structure to house the electrode assembly 110, and the second casing material 202 is flatly formed to cover the electrode assembly 110 that is received in the first casing material 201. The second casing material may be coupled or connected to the first casing material (e.g., by thermal fusion-bonding).

Figure 3:
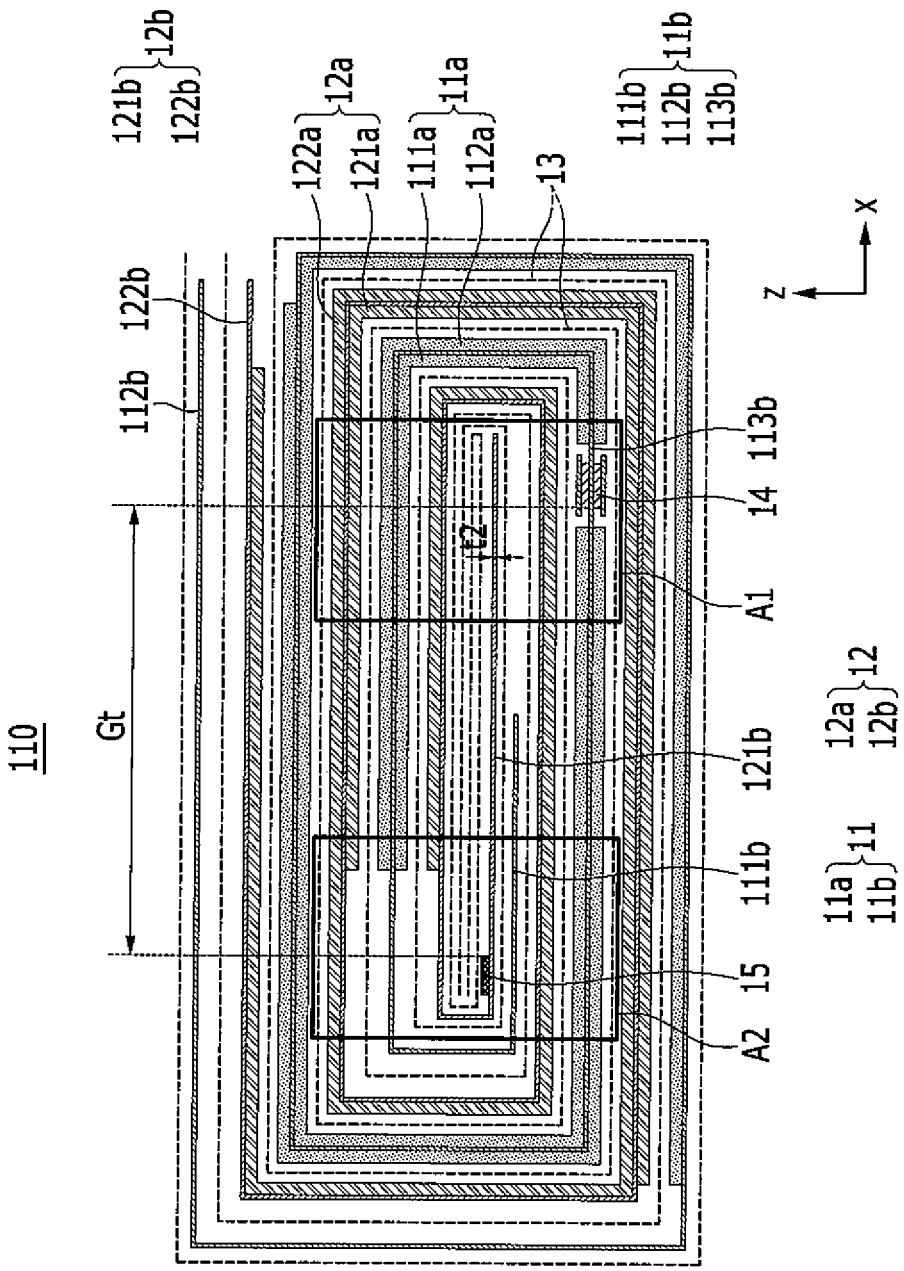
FIG. 3 is a partial, enlarged cross-sectional view of an electrode assembly of FIG. 1.
Figure 4:
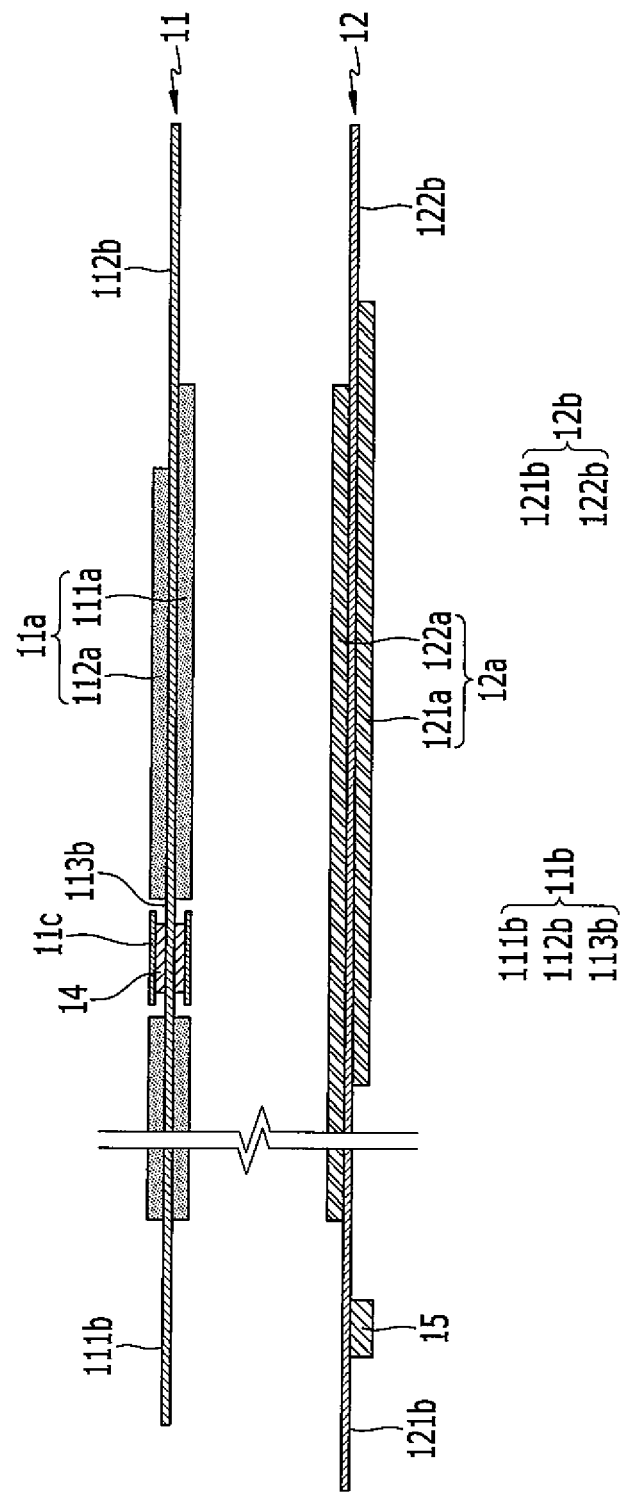
FIG. 4 is a cross-sectional view of a spread (flat) positive electrode and negative electrode of the electrode assembly of FIG. 3.

FIG. 3 is a partial, enlarged cross-sectional view of an electrode assembly that is applied to FIG. 1, and FIG. 4 is a cross-sectional view of spread positive and negative electrodes (e.g., positive and negative electrodes prior to spiral-winding) that are applied to the electrode assembly of FIG. 3.

Referring to FIGS. 3 and 4, the positive electrode 11 includes a coated region 11a at which an active material is applied to a current collector of a metal thin plate, and an uncoated region 11b that is set to (e.g., located at) an exposed current collector because an active material is not applied thereto. For example, a current collector and the positive electrode tab 14 of the positive electrode 11 may be made of aluminum Al.

At the positive electrode 11, the coated region 11a includes an inner surface coated region 111a that is formed to be at an inner surface of a spiral-wound current collector, and an outer surface coated region 112a that is formed to be at an outer surface of a current collector. The uncoated region 11b includes an internal side end uncoated region 111b that is located at the inside of the spiral-wound electrode assembly 110, an external side end uncoated region 112b that is located at the outside of the electrode assembly 110, and a gap uncoated region 113b that is provided between the coated regions 11a.

The negative electrode 12 includes a coated region 12a at which a different active material from an active material of the positive electrode 11 is applied to a current collector of a metal thin plate, and an uncoated region 12b that is set to (e.g., located at) an exposed current collector because an active material is not applied thereto. For example, a current collector and a negative electrode tab 15 of the negative electrode 12 may be made of copper (Cu).

At the negative electrode 12, the coated region 12a includes an inner surface coated region 121a that is formed to be at an inner surface of the spiral-wound current collector, and an outer surface coated region 122a that is formed to be at an outer surface of the current collector. The uncoated region 12b includes an internal side end uncoated region 121b that is located at the inside of the spiral-wound electrode assembly 110, and an external side end uncoated region 122b that is located at the outside of the electrode assembly 110.

In the electrode assembly 110, the positive electrode tab 14 is coupled or connected to the positive electrode 11 in a first area A1, and the negative electrode tab 15 is coupled or connected to the negative electrode 12 in a second area A2 adjacent to the first area A1 (or the second area A2 is spaced apart from the first area A1). For example, the positive electrode tab 14 is disposed in the first area A1, and the negative electrode tab 15 is disposed in the second area A2. In this case, the positive and negative electrodes tabs 14 and 15 maintain a tab gap Gt.

The positive electrode tab 14 is coupled or connected to the gap uncoated region 113b of the positive electrode 11 in the first area A1. In a thickness direction (z-axis direction) of the electrode assembly 110, in the first area A1 facing the positive electrode tab 14, the internal side end uncoated region 121b of the negative electrode 12 is extended via the second area A2 (e.g., the internal side end uncoated region 121b of the negative electrode 12 extends through the second area A2 to or through the first area A1). Because the coated region 12a of the negative electrode 12 is not provided in the first area A1 of the electrode assembly 110 by the positive electrode tab 14, a thickness increase may be prevented (or an amount of a thickness increase may be reduced). For example, because the internal side end uncoated region 121b of the negative electrode 12 extends to or through the first area A1, a thickness increase due to the presence of the positive electrode tab 14 may be reduced.

The negative electrode tab 15 is coupled or connected to the internal side end uncoated region 121b of the negative electrode 12 in the second area A2. Because the negative electrode tab 15 has a thickness, the internal side end uncoated regions 111b and 121b where the coated regions 11a and 12a of the positive electrode 11 and the negative electrode 12 are removed are provided in the second area A2. Because the coated regions 11a and 12a of the positive and negative electrodes 11 and 12 are not provided, in the second area A2 of the electrode assembly 110 by the negative electrode tab 15, a thickness increase may be prevented (or an amount of a thickness increase may be reduced). For example, because the internal side end uncoated regions 111b and 121b are present in the second area A2, a thickness increase due to the presence of the positive electrode tab 15 may be reduced. Further, the internal side end uncoated region 121b of the negative electrode 12 revolves (e.g., is spiral-wound) to face the negative electrode tab 15 in a thickness direction (z-axis direction) of the electrode assembly 110 to be further extended in the second area A2 and is thus extended to the first area A1.

In the first example embodiment, the negative electrode tab 15 is coupled or connected to the internal side end uncoated region 121b of the negative electrode 12 in the second area A2, and the negative electrode tab 15 may be coupled or connected to the external side end uncoated region 122b of the negative electrode 12.

For this purpose, at the positive electrode 11, the internal side end uncoated region 111b is set to (or defined by) the inner and outer surface coated regions 111a and 112a that are started on the same or substantially the same line, and the external side end uncoated region 112b is set to (or defined by) the inner surface coated region 111a that is formed longer at an outer edge of the electrode assembly 110 and the outer surface coated region 112a that is formed smaller than the inner surface coated region 111a. For example, at the positive electrode 11, the inner and outer surface coated regions 111a and 112a abut the internal side end uncoated region 111b along a same or substantially the same line, while the inner and outer surface coated regions 111a and 112a abut the external side end uncoated region 112b at different lines (or locations). In some embodiments, the inner surface coated region 111a has a length longer than that of the outer surface coated regions 112a.

At the negative electrode 12, the internal side end uncoated region 121b is set to (or defined by) the outer surface coated region 122a that is formed to be long and the inner surface coated region 121a that is formed smaller than the outer surface coated region 122a to correspond thereto, and the external side end uncoated region 122b is set to (or defined by) the outer surface coated region 122a that is formed to be small and the inner surface coated region 121a that is formed longer than the outer surface coated region 122a. For example, at the negative electrode 12, the inner and outer surface coated regions 121a and 122a abut the internal side end uncoated region 121b at different lines (or locations), and the inner and outer surface coated regions 121a and 122a abut the external side end uncoated region 122b at different lines (or locations).

In this case, in the internal side end uncoated region 121b of the negative electrode 12, the outer surface coated region 122a enables ion exchange upon charging and discharging to correspond to the inner surface coated region 111a in the internal side end uncoated region 111b of the positive electrode 11. For example, at a location corresponding to a portion of the internal side end uncoated region 121b of the negative electrode 12, the outer surface coated region 122a faces the inner surface coated region 111a.

In the external side end uncoated region 122b of the negative electrode 12, the outer surface coated region 122a enables ion exchange upon charging and discharging to correspond to the inner surface coated region 111a of the external side end uncoated region 112b of the positive electrode 11. For example, at a location corresponding to a portion of the external side end uncoated region 112b of the positive electrode 11, the outer surface coated region 122a faces the inner surface coated region 111a.

Further, in the external side end uncoated region 122b of the negative electrode 12, the inner surface coated region 121a enables ion exchange upon charging and discharging to correspond to the outer surface coated region 112a of the external side end uncoated region 112b of the positive electrode 11. For example, at a location corresponding to a portion of the external side end uncoated region 122b of the negative electrode 12, the outer surface coated region 112a faces the inner surface coated region 121a.

Figure 5:
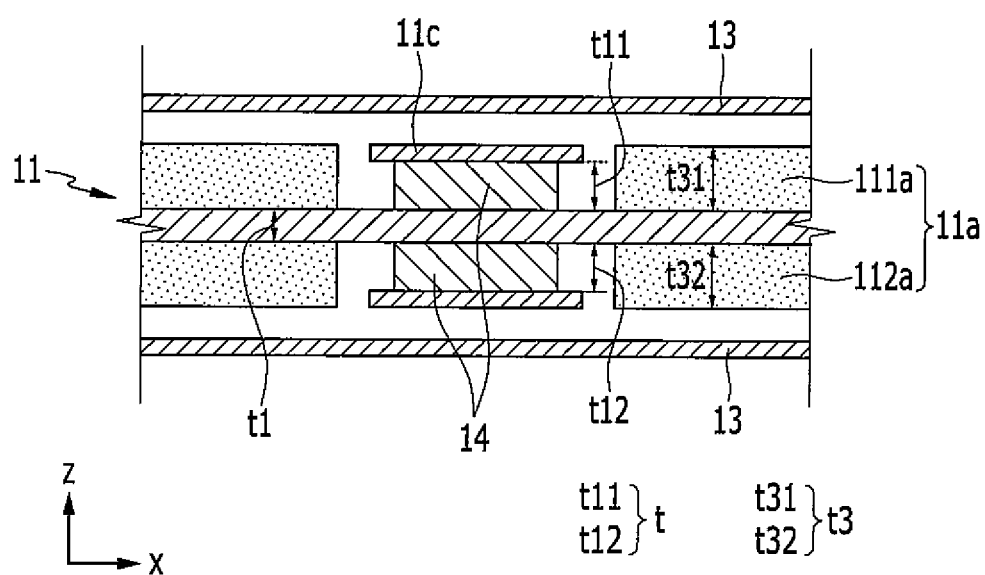
FIG. 5 is a cross-sectional view illustrating a portion in which a positive electrode tab is coupled or connected to a positive electrode.

FIG. 5 is a cross-sectional view illustrating a portion in which a positive electrode tab is coupled or connected to a positive electrode. Referring to FIG. 5, the positive electrode tab 14 is provided at both surfaces of the gap uncoated region 113b. A thickness t (t=t11+t12) of the positive electrode tab 14 that is provided at both surfaces is set to a sum thickness t3 (t3=t31+t32) or less of the coated region 11a that is provided at both surfaces of the positive electrode 11 (2t≤2t3).

The thickness t of the positive electrode tab 14 is set to the sum of an inside thickness t11 (e.g., a thickness of the outside positive electrode tab) and an outside thickness t12 (e.g., a thickness of the inside positive electrode tab), and the sum thickness t3 of the coated region 11a is set to a thickness t31 of the inner surface coated region 111a and a thickness t32 of the outer surface coated region 112a.

For example, the thickness t of the positive electrode tab 14 may be 70-90% of the sum thickness t3 of the coated region 11a that is provided at both surfaces of the positive electrode 11 (e.g., 0.7t3<t<0.9t3). Therefore, even when coupling or connecting the positive electrode tab 14 to the gap uncoated region 113b, due to the positive electrode tab 14, a thickness increase of a thickness direction (z-axis direction) of the electrode assembly 110 may not occur (or may be reduced).

The positive electrode 11 further has an insulating tape 11c that is attached to the positive electrode tab 14 that is provided at both surfaces of the gap uncoated region 113b. The insulating tape 11c removes (or reduces) a possibility of the positive electrode tab 14 penetrating an insulating wall of the separator 13 and being short-circuited from the negative electrode 12. In this way, when the insulating tape 11c is attached to the positive electrode tab 14, an upper surface of the insulating tape 11c is not protruded further than a surface of the coated region 11a.

For example, the thickness t of the positive electrode tab 14 may be 80% of the sum thickness t3 of the coated region 11a that is provided at both surfaces of the positive electrode 11 (t=0.8t3). Therefore, even when coupling or connecting the positive electrode tab 14 to the gap uncoated region 113b, due to the positive electrode tab 14, a design margin of a thickness direction (z-axis direction) of the electrode assembly 110 may be further increased, and even when attaching the insulating tape 11c, a design margin of a thickness direction (z-axis direction) can be stably secured.

Further, the insulating tape 11c is formed to be within a gap range of the gap uncoated region 113b. For example, because the insulating tape 11c is not attached to the coated region 11a that is provided at both sides of the gap uncoated region 113b, a design margin of a thickness direction (z-axis direction) is not reduced. In some embodiments, a width of the insulating tape 11c is less than a distance between the outer surface coated regions 112a of the positive electrode 11 at the gap uncoated region 113b, and/or less than a distance between the inner surface coated regions 111a.

Further, the thickness t of the positive electrode tab 14 is smaller than the sum of a thickness t1 of the gap uncoated region 113b of the positive electrode 11 and a thickness t2 (see FIG. 3) of the internal side end uncoated region 121b of the negative electrode 12 in the first area A1 (t<t1+t2).

For example, because the thickness t of the positive electrode tab 14 is smaller than the sum of the thickness t1 of the gap uncoated region 113b and the thickness t2 of the internal side end uncoated region 121b, a thickness increase possibility due to the positive electrode tab 14 may be largely weakened (or reduced).

In the foregoing description, an example embodiment of the present disclosure is described with respect to a pouch-type rechargeable battery (or a pouch kind of rechargeable battery), but the present disclosure is not limited thereto. For example, the above-described features may be equally applied even to a square rechargeable battery and thus flatness of an electrode assembly and a cell can be improved and a design margin of a thickness in the electrode assembly can be secured. Further, a first electrode may be operated as a negative electrode, and a second electrode may be operated as a positive electrode.

While this disclosure has been described in connection with what are presently considered to be practical example embodiments, it is to be understood that the disclosure is not limited to the disclosed embodiments, but, on the contrary, is intended to cover various modifications and equivalent arrangements included within the spirit and scope of the appended claims, and equivalents thereof.

| Description of some of the symbols | |
|---|---|
| 11: first electrode (positive electrode) | 11a, 12a: coated region |
| 11b, 12b: uncoated region | 11c: insulating tape |
| 12: second electrode (negative electrode) | 13: separator |
| 14: first electrode tab (positive electrode tab) | |
| 15: second electrode tab (negative electrode tab) | |
| 16, 17: insulating member | 110: electrode assembly |
| 111a, 121a: inner surface coated region | |
| 111b, 121b: internal side end uncoated region | |
| 112a, 122a: outer surface coated region | |
| 112b, 122b: external side end uncoated region | |
| 113b: gap uncoated region | 120: case (pouch) |
| 121: polymer sheet | 122: nylon sheet |
| 123: metal sheet | 201: first casing material |
| 202: second casing material | A1: first area |
| A2: second area | Gt: tab gap |
| t: thickness (t = t11 + t12) of positive electrode tab | |
| t1: thickness of gap uncoated region | |
| t11, t12: inside and outside thickness | |
| t2: thickness of internal side end uncoated region | |
| t3: sum thickness (t3 = t31 + t32) of coated region | |
| t31, t32: thickness of inner and outer surface coated regions | |

What is claimed is:

1. A rechargeable battery, comprising:
    an electrode assembly comprising a separator between a first electrode and a second electrode each having uncoated regions and coated regions, and in which the separator, the first electrode, and the second electrode are spirally wound;
    a case that houses the electrode assembly; and
    a first electrode tab and a second electrode tab to be drawn outside of the case that are respectively coupled to the uncoated regions of the first electrode and the second electrode while maintaining a tab gap between the first electrode tab and the second electrode tab,
    wherein the first electrode tab is provided to directly contact two surfaces of a gap uncoated region of a single layer of the first electrode between the coated regions of the first electrode,
    wherein the first electrode tab is drawn outside of the case to be substantially parallel to the gap uncoated region, and
    wherein in a thickness direction of the electrode assembly, in an area facing the first electrode tab, an internal side end uncoated region of the second electrode is located.

2. The rechargeable battery of claim 1, wherein the second electrode has one of the uncoated regions at an internal side end thereof and another one of the coated regions at an external side end thereof in a spiral-wound state, and
    the second electrode tab is selectively coupled to the internal side end uncoated region or the external side end uncoated region of the second electrode.

3. The rechargeable battery of claim 2, wherein the second electrode tab is coupled to the internal side end uncoated region of the second electrode in a spiral-wound state.

4. The rechargeable battery of claim 3, wherein the internal side end uncoated region of the second electrode is extended in the area facing the first electrode tab in the thickness direction of the electrode assembly.

5. The rechargeable battery of claim 4, wherein a thickness t of the first electrode tab is smaller than a sum of a thickness t1 of the gap uncoated region of the first electrode and a thickness t2 of the internal side end uncoated region of the second electrode, such that $t<t1+t2$.

6. The rechargeable battery of claim 1, wherein a thickness t of the first electrode tab is less than or equal to a sum thickness t3 of the coated region that is provided at the two surfaces of the first electrode such that $t \leq t3$.

7. The rechargeable battery of claim 6, wherein the thickness t of the first electrode tab is 70 to 90% of the sum thickness t3 of the coated region that is provided at the two surfaces of the first electrode such that $0.7t3<t<0.9t3$.

8. The rechargeable battery of claim 7, wherein the thickness t of the first electrode tab is 80% of the sum thickness t3 of the coated region that is provided at the two surfaces of the first electrode such that $t=0.8t3$.

9. The rechargeable battery of claim 1, wherein the first electrode further comprises an insulating tape attached to the first electrode tab provided at the two surfaces of the gap uncoated region.

10. The rechargeable battery of claim 9, wherein the insulating tape is formed to be within a gap range of the gap uncoated region.

11. The rechargeable battery of claim 1, wherein the first electrode is a positive electrode, and the second electrode is a negative electrode.

12. The rechargeable battery of claim 1, wherein the first electrode is a negative electrode, and the second electrode is a positive electrode.

13. The rechargeable battery of claim 1, wherein the case is formed to be a pouch kind that houses the electrode assembly.

14. The rechargeable battery of claim 1, wherein the case is formed to have a square shape that houses the electrode assembly.

15. A rechargeable battery, comprising:
an electrode assembly comprising a separator between a first electrode and a second electrode each having uncoated regions and coated regions, and in which the separator, the first electrode, and the second electrode are spirally wound;
a case that houses the electrode assembly; and
a first electrode tab and a second electrode tab to be drawn outside of the case that are respectively coupled to the uncoated regions of the first electrode and the second electrode while maintaining a tab gap between the first electrode tab and the second electrode tab,
wherein the first electrode tab is coupled to a gap uncoated region of the first electrode between the coated regions of the first electrode,
wherein in a thickness direction of the electrode assembly, in an area facing the first electrode tab, an internal side end uncoated region of the second electrode is located,
wherein the internal side end uncoated region of the second electrode faces the second electrode tab in the thickness direction of the electrode assembly,
wherein one of the uncoated regions of the first electrode comprises an internal side end uncoated region in a spiral-wound state, the internal side end uncoated region is spaced apart from the gap uncoated region so that at least one of the coated regions is disposed therebetween, and
wherein the internal side end uncoated region of the first electrode is extended in an area facing the second electrode tab in the thickness direction of the electrode assembly.

* * * * *